3,031,482
PREPARATION OF CONVERSION PRODUCTS
OF RICINOLEATES
Werner Stein, Dusseldorf-Holthausen, and Horst Hennig, Dusseldorf-Oberkassel, Germany, assignors to Henkel & Cie., G.m.b.H., Dusseldorf-Holthausen, Germany, a German corporation
No Drawing. Filed Aug. 30, 1956, Ser. No. 606,986
Claims priority, application Germany Sept. 13, 1955
14 Claims. (Cl. 260—413)

This invention relates to new and useful improvements in the preparation of conversion products of ricinoleates.

It is known that sebacic acid and hydroxy capric acid which are used in the manufacture of fruit flavoring, perfumes, and for celluloid and other plastics, may be produced by thermally splitting a salt of ricinoleic acid and in particular an alkali ricinoleate. In addition to the formation of the sebacic and hydroxy capric acids, octanone or octanol is also produced.

The starting alkali ricinoleate is generally obtained from castor oil by reaction with an alkali. The castor oil contains about 85% ricinoleic acid in the form of the glyceride and is generally used as such in industrial operation though it is possible to separate the ricinoleate or free acid from the castor oil by saponification or splitting, recovering the glycerol liberated and purifying the ricinoleate or free acid after neutralization.

The conversion of the ricinoleate into the hydroxy capric acid or sebacic acid may be catalyzed with the use of cadmium or cadmium compounds. Various reaction conditions may be used, as for example as described in U.S. Patent No. 2,182,056.

One object of this invention is to increase the yields and the reaction velocity while allowing operation at a lower temperature in the conversion of ricinoleates into hydroxy capric acid and/or sebacic acid. This, and still further objects, will become apparent from the following description:

In accordance with the invention, it has been found that the splitting of ricinoleates at elevated temperature into hydroxy capric acid and/or sebacic acid is catalyzed by the presence of lead, bismuth or thallium, their compounds and/or their alloys, so that the reaction may be effected at a lower temperature, will proceed at a higher reaction velocity and produce higher yields under comparable conditions.

The conversion of the ricinoleates is generally effected by heating the same in the presence of water in an alkali such as alkali hydroxide. An excess of alkali is generally necessary to obtain good yields, and with the use of the catalyst in accordance with the invention the excess is considerably reduced. Thus for example for the preparation of sebacates from ricinoleates, one mol of alkali hydroxide is theoretically required per mol of ricinoleate. Optimum yields, however, are only obtained when such an excess of alkali is used that about 4 mols of alkali hydroxide is present per mol of alkali ricinoleate. In operating with the catalyst, in accordance with the invention, the excess required for obtaining the optimum yields is substantially reduced so that an excess of only about one mol of alkali hydroxide per mol of alkali ricinoleate is required.

The same holds true in the production of the hydroxy caprates except that for each mol of ricinoleate one mol of alkali less is required than for the preparation of the sebacates. This is to say that theoretically no excess of alkali is needed in this case.

The formation of a hydroxy capric acid takes place at a temperature of about 150° C., though it is preferable to operate at temperatures between about 160 and 190° C. At these temperatures, some sebacic acid forms but a marked production of sebacic acid only commences at temperatures above about 200° C. For the production of these sebacic acids, it is preferable to use temperatures in excess of about 235° C. since the reaction velocity increases with the reaction temperatures. Temperatures up to the temperature of incipient decomposition of the organic materials present in the reaction mixture may be used. In this connection, in the temperature range above 400 to 450° C. decomposition is generally to be expected, the commencement of the decomposition being dependent upon the composition of the reaction mixture and is displaced toward higher temperatures with an increase in the water content. The temperature range of greatest practical importance for the preparation of the sebacic acid is between 250 and 350° C.

In order to effect the conversion, one mol of water is theoretically required for each mol of ricinoleate. In practical operation, however, it is generally desirable to use an excess of water, as for example, 1.5 mols of water and more, and preferably 3 to 20 mols of water per mol of ricinoleate. The presence of the water in the reaction mixture results in a liquification of the reaction mixture, which in itself is thickly viscous at the reaction temperature and therefore, relatively difficult to handle in the low water state.

The reaction may be effected under pressure in order to maintain the water in the liquid phase. For this purpose, the reaction may be effected in a closed pressure vessel under the pressure developed. The hydrogen formed during the reaction also results in an increase in the pressure in the reaction vessel provided the same is not released.

The pressure may for example vary between about 10 or preferably 30 to 200 kilograms per square centimeter. It is also possible, however, to operate at lower pressures or without pressure so that the water present in the reaction mixture will evaporate. In this case, it is preferable to effect the reaction in a steam atmosphere so that the quantity of water theoretically necessary to split the alkali ricinoleate is always present in the reaction mixture. For the liquefaction of the reaction mixture, there may also be used alkali soaps which are liquid at the reaction temperature, as proposed in German Patent 880,293.

In accordance with the invention, any of the conventional methods for the conversion of the ricinoleates may be used with the additional presence of the catalysts. Thus for example the various methods for the preparation of sebacic acids as are well known and described in U.S. Patent 2,182,056 may be used. The catalysts show activity in accelerating the reaction in the conversion of the ricinoleate into the hydroxy caprate, and the conversion of the ricinoleate into the sebacate.

The catalytic action is noted even upon the addition of relatively small amounts of catalysts and occurs, for example, with the addition of as little as 0.05% by weight of metal referred to the ricinoleate present in the reaction mix. It is, however, preferable to operate with larger quantities of catalyst and preferably with 0.5 to 20% by weight of metal referred to the ricinoleate present in the reaction mix. It is even possible to use larger quantities so that, for example, the metal used is equivalent to the ricinoleate present. It is also possible to use as the ricinoleate, a salt of ricinoleic acid with a catalyst metal in accordance with the invention.

The catalysts to be used in accordance with the invention can be employed in the form of the free metals or their compounds, particularly in the form of compounds which are reduced to the free metals under the reaction conditions. Such compounds which can be added to the reaction mixture are for example the carbonates, bicarbonates, oxides or hydroxides of lead, bismuth or thallium. The additions of the catalyst can therefore be effected in the form of all these compounds or in the form of compounds which form hydroxides or oxides with alkali hydroxides under the reaction conditions. Such compounds are for examples the chlorides, bromides, iodides, sulfites, sulfates, phosphates, nitrites, nitrates, formates, acetates, oxalates, stearates, oleates, ricinoleates, benzoates, phthalates, benzene sulfonates or paraffin sulfonates, as well as salts of other inorganic or organic acids, particularly mineral acids or carboxylic or sulfonic acids. If the catalyst metals are amphoteric, they can also be used in the form of salts in which the metal is in the acid radical for instance, lead as plumbites or plumbates. Complex salts of the metals can also be used. Finally there may be used metallorganic compounds, for instance tetraethyl lead, diphenyl lead or other metal alkyls or aryls as catalytically active metal compounds.

Lead, bismuth and thallium or their compounds may be used in combination with one another with particular advantage. The said metals form with one another, with cadmium, which is also catalytically active and with catalytically inactive metals, a large number of alloys known per se, the melting points of which may be above or below the melting points of the said catalytically active metals.

The low-melting alloys, in addition to their catalytic action, also have the particular advantage of allowing the recovery of the catalyst by separation of the liquid metal from the reaction mixture, which is of great value both in continuous and in intermittent operation. In case of continuous operation, the liquid catalyst can be recycled through the reaction system. To be sure, even when using the pure metals lead, thallium or bismuth, it is possible to operate above the melting points of said metals (lead=327° C., thallium=303° C., bismuth= 271° C.), which as a matter of fact has already been done in the case of cadmium (321° C.), but the separation of the liquid metal from the reaction mixture must be effected above its melting point and thus at least at the reaction temperature, since otherwise the liquid metals could solidify at other, colder places of the apparatus and result in clogging there. If, however, alloys the melting points of which are relatively far below the reaction temperature, are used, it is possible to separate the catalyst at lower temperatures in liquid condition from the reaction mixture. The high specific weights of such alloys promote the separation, so that the liquid metals easily settle at the bottom of the vessels in question. The separation of the metal can be effected at any desired place, as for example in the reaction vessel proper, or in a special separator and after dilution of the reaction mixture with water. The alloys separated from the reaction mixture can either be returned to the process for recycling or be worked up to metal compounds.

As metals or alloys, there are to be used in particular those whose melting points are less than 300° C., and preferably less than 200° C.

Among the alloys of lead, thallium and bismuth, there are a particularly large number having low melting points which in many cases are even below 100° C. In accordance with the present invention there are used for instance alloys of the systems Pb+Bi, Pb+Tl, Pb+Cd
Bi+Tl, Bi+Cd, Tl+Cd
Pb+Bi+Tl, Pb+Bi+Cd, Bi+Tl+Cd
Pb+Bi+Tl+Cd The metals to be used in accordance with the invention or their alloys can however also be combined with other metals which in themselves are inactive, as for instance with metals which melt at a lower or higher temperature than the metals to be used in accordance with the invention. These include indium (156° C.), tin (232° C.) and antimony (630° C.). The following table contains metals or metal alloys having melting points below 300° C.

| Metal or Alloy (Figures=percent by weight) | Melting Point in ° C. |
|---|---|
| Bi | 271 |
| 10-75 Pb, balance Sn | 190-270 |
| 82.5 Pb+17.5 Cd | 248 |
| 87 Pb+13 Sb | 247 |
| 83 Tl+17 Cd | 204 |
| 38 Pb+62 Sn | 193 |
| 62 Bi+38 Cd | 144 |
| 58 Bi+42 Sn | 136 |
| 44 Pb+56 Bi | 125 |
| 60 Bi+30 Cd+10 Tl | 125 |
| 53 Bi+26 Sn+21 Cd | 103 |
| 52 Bi+32 Pb+16 Sn | 96 |
| 50 Bi+25 Pb+25 Sn | 94 |
| 50 Bi+30 Pb+20 Sn | 92 |
| 50 Bi+26.7 Pb+13.3 Sn+10 Ce | 70 |
| 50 Bi+25 Pb+12.5 Sn+12.5 Cd | 60 |
| 40.95 Bi+22.10 Pb+18.10 In+10.65 Sn+8.20 Cd | 46 |

As alloys, there may be used alloys of two or more components, the composition of low-melting eutectics being preferably selected. Since however frequently even slight additions of a foreign metal to a catalytically active metal are sufficient considerably to reduce the melting point of the latter, the use of eutectic mixtures is not absolutely necessary if it is desired to operate with a low melting mixture. Accordingly, the alloys can contain at least 5% by weight of the active metal to be used in accordance with the invention and preferably 10 to 95% thereof by weight. In case of the use of alloys, the quantities of catalyst given further below refer to the quantity of the active component, to be used in accordance with the invention, present in the alloy.

The invention, however, does not extend merely to the use of low-melting alloys, but also to the use of pure metals or alloys which have a higher melting point than the pure metals.

Since the catalytically active metals or their alloys need not be added in pure form, it is possible to use scrap or intermediate products of metallurgical processes having corresponding contents of lead, bismuth, or thallium in accordance with the invention as catalysts.

In order to demonstrate the catalytic acceleration of the reaction by the catalyst in accordance with the invention, the experiments described in the following examples, which are given by way of illustration and not limitation, were carried out with short periods of heating. With longer duration of the tests, the yields increase even further. In the carrying out of the process on an industrial scale, the duration of the reaction is strongly dependent on the reaction temperature and the apparatus. Under favorable conditions, good yields can be obtained in even only 10 to 30 minutes. The duration of the heating, however, can also be extended to three to six hours.

The reaction batches of the experiments described in the examples were heated in an autoclave provided with an agitator at an initial pressure of 10 atm. nitrogen (Examples 2, 6-9, 16, 18-23 and 25-27) or hydrogen (Examples 1, 3-5, 10-15 and 17) to the temperature indicated. Since the reaction commences during the heating up and continues after exceeding the maximum temperature indicated in the examples and also takes place for a certain period of time during the cooling, the autoclave, in order to obtain reaction times which are as definitely defined as possible, was removed from the heating immediately after attaining the maximum temperature indicated in the examples, and compressed air was outwardly blown in, against the autoclave in order to accelerate the cooling. In case of the preparation of sebacic acid there is given as reaction time the time interval during which the reaction mixture was at a temperature above 250° C. The indicated maximum temperature was maintained only for a short period of time, and in most cases only one to two minutes. In case of the preparation of hydroxy capric acid, there is given as reaction time the time interval during which the reaction mixture was at temperatures above 150° C. After the cooling, the pressure present in the autoclave (hydrogen formed during the reaction and hydrogen or nitrogen initially introduced under pressure) was reduced and the solidified reaction mass crushed. The catalyst metal had to the greatest extent collected on the bottom of the autoclave and could be removed from there as a fused-together, possibly solidified mass. The reaction product was dissolved in hot water, and the solution brought to a pH of 6 by means of hydrochloric acid. In this connection, the sebacic acid remained as sodium salt in solution, while octanol formed in the reaction and monobasic fatty acids were separated as oily layer. This oil layer was extracted several times more with hot water in order to remove all sebacic acid. From the combined aqueous solutions upon acidification to a pH of 2, the sebacic acid precipitated in the form of colorless crystals of high purity. They were washed and dried. In the preparation of hydroxy capric acid, the product was worked up in the same manner. The content of hydroxy capric acid as well as sebacic acid in the reaction product was ascertained by determination of the OH-number. Insofar as no mention of pressure is made in the examples, there prevailed a maximum pressure in the range of 105 to 135 kg./cm.$^2$ when employing castor oil fatty acid and a maximum pressure in the range of 135 to 165 kg./cm.$^2$ when using castor oil.

In the calculation of the yields, it was taken into consideration that the castor oil fatty acids (=total of the fatty acids found in ester form in the castor oil, or fatty acids obtained therefrom) consist only to the extent of about 85 percent by weight of ricinoleic acid

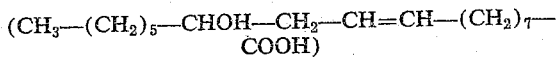

$(CH_3—(CH_2)_5—CHOH—CH_2—CH=CH—(CH_2)_7—COOH)$

Example 1

Batch:
  298 grams castor oil fatty acid (1 mol)
  120 grams NaOH (3 mol)
  105 grams water (5.8 mol)
  15 grams lead stearate (containing 4 grams Pb)
Temperature to 320° C., time of stay above 250° C.: 84 minutes. The yield: 144.5 grams sebacic acid=84% of the theoretical yield.

Example 2

Batch:
  298 grams castor oil fatty acid (1 mol)
  120 grams NaOH (3 mol)
  105 grams water (5.8 mol)
  9 grams Bi(NO$_3$)$_3$.5H$_2$O (containing 3.9 grams Bi)
Temperature to 320° C.; time of stay above 250° C.: 40 minutes. The yield: 140 grams sebacic acid=81.5% of the theoretical yield.

Example 3

Batch:
  298 grams castor oil fatty acid (1 mol)
  120 grams NaOH (3 mol)
  105 grams water (5.8 mol)
  4.95 grams PbCl$_2$ } (containing 4.5 grams metal)
  0.9 gram CdO
Temperature to 320° C.; time of stay above 250° C.: 44 minutes. Yield: 146.5 grams sebacic acid=85.2% of the theoretical yield.

The CdO and PbCl$_2$ used gave 4.5 grams metal alloy of a melting point of 248° C. Referred to the quantity of sodium ricinoleate used, this constituted 1.4%. When the quantity of the mixed catalyst was increased to 5%, the yield of sebacic acid rose to 154 grams=89.5% of the theoretical yield.

Example 4

Batch:
  298 grams castor oil fatty acid (1 mol)
  120 grams NaOH (3 mol)
  105 grams water (5.8 mol)
  4.95 grams PbCl$_2$ } (containing 4.5 grams metal)
  0.9 gram CdO
Temperature to 350° C.; time of stay above 250° C.: 72 minutes. Yield: 145 grams sebacic acid=84.4% of the theoretical yield.

Example 5

Batch:
  298 grams castor oil fatty acid (1 mol)
  120 grams NaOH (3 mol)
  105 grams water (5.8 mol)
  4.95 grams PbCl$_2$ } (containing 4.5 grams metal)
  0.9 gram CdO
Temperature to 275° C.; time of stay above 250° C.: 10 minutes. Yield: 144 grams sebacic acid=83.8% of the theoretical yield.

Example 6

Batch:
  298 grams castor oil fatty acid (1 mol)
  120 grams NaOH (3 mol)
  105 grams water (5.8 mol)
  6.3 grams Bi(NO$_3$)$_3$.5H$_2$O (containing 4.5 grams metal)
  2.1 grams CdO
Temperature to 320° C.; time of stay above 250° C.: 43 minutes. Melting point of the catalyst alloy: 146° C. Yield: 143.5 grams sebacic acid=83.5% of the theoretical yield.

Example 7

Batch:
  298 grams castor oil fatty acid (1 mol)
  120 grams NaOH (3 mol)
  105 grams water (5.8 mol)
  3.9 grams BiCl$_3$ } (containing 4.5 grams metal)
  2.6 grams PbCl$_2$
Temperature to 320° C.; time of stay above 250° C.: 38 minutes. Melting point of the catalyst alloy 127° C. Yield: 141.5 grams sebacic acid=82.4% of the theoretical yield.

Example 8

Batch:
  298 grams castor oil fatty acid (1 mol)
  120 grams NaOH (3 mol)
  105 grams water (5.8 mol)
  5.40 grams Bi(NO$_3$)$_3$.5H$_2$O
  2.41 grams PbCl$_2$ } (containing 4.5 grams metal)
  0.42 gram CdO
Temperature to 320° C.; time of stay above 250° C.: 41 minutes. Melting point of the catalyst alloy 92° C. Yield: 146 grams sebacic acid=85% of the theoretical yield.

Example 9

Batch:
  298 grams castor oil fatty acid (1 mol)
  120 grams NaOH (3 mol)
  105 grams water (5.8 mol)
  35.0 grams BiCl$_3$
  24.1 grams PbCl$_2$ } (containing 45 grams metal)
  4.2 grams CdO
Temperature to 320° C.; time of stay above 250° C.: 36 minutes. Yield: 158 grams sebacic acid=92% of the theoretical yield.

Example 10

Batch:
- 298 grams castor oil fatty acid (1 mol)
- 120 grams NaOH (3 mol)
- 105 grams water (5.8 mol)
- 5.40 grams $Bi(NO_3)_3 \cdot 5H_2O$
- 2.41 grams $PbCl_2$
- 0.42 grams CdO (containing 4.5 grams metal)

Temperature to 275° C.; time of stay above 250° C.: 18 minutes. Yield: 142 grams sebacic acid=82.6% of the theoretical yield.

Example 11

For comparison with the results of Examples 1 to 10, a test was carried out without the addition of catalyst.

Batch:
- 298 grams castor oil fatty acid (1 mol)
- 120 grams NaOH (3 mol)
- 105 grams water (5.8 mol)
- Without catalyst Temperature to 320° C.; time of stay above 250° C.: 57 minutes. Yield: 128.5 grams sebacic acid=74.6% of the theoretical yield.

Example 12

Batch:
- 312 grams castor oil (1 mol)
- 120 grams NaOH (3 mol)
- 105 grams water (5.8 mol)
- 5.40 grams $Bi(NO_3)_3 \cdot 5H_2O$
- 2.41 grams $PbCl_2$
- 0.42 gram CdO (containing 4.5 grams metal)

Temperature to 320° C.; time of stay above 250° C.: 56 minutes. Yield: 139.5 grams sebacic acid=81.2% of the theoretical yield.

Example 13

Batch:
- 312 grams castor oil (1 mol)
- 120 grams NaOH (3 mol)
- 105 grams water (5.8 mol)
- 4.95 grams $PbCl_2$
- 0.9 grams CdO (containing 4.5 grams metal)

Temperature to 320° C.; time of stay above 250° C.: 58 minutes. Yield: 139.5 grams sebacic acid=81.2% of the theoretical yield.

Example 14

Batch:
- 312 grams castor oil (1 mol)
- 200 grams NaOH (5 mol)
- 131 grams water (7.3 mol)
- 4.95 grams $PbCl_2$
- 0.9 gram CdO (containing 4.5 grams metal)

Temperature to 320° C.; time of stay above 250° C.: 34 minutes. Yield: 141 grams sebacic acid=82% of the theoretical yield.

Example 15

Batch:
- 312 grams castor oil (1 mol)
- 200 grams NaOH (5 mol)
- 131 grams water (7.3 mol)
- 4.95 grams $PbCl_2$
- 0.9 gram CdO (containing 4.5 grams metal)

Temperature to 350° C.; time of stay above 250° C.: 58 minutes. Yield: 142.5 grams sebacic acid=82.9% of the theoretical yield.

Example 16

For comparison with the results of Examples 12 to 15, there were carried out two experiments without the addition of catalyst with 3 and 5 mols NaOH.

Batch:
- 312 grams castor oil (1 mol)
- 120 grams NaOH (3 mol)
- 105 grams water (5.8 mol)
- No catalyst Temperature to 320° C.; time of stay above 250° C.: 44 minutes. Yield: 95 grams sebacic acid=55.2% of the theoretical yield.

Example 17

Batch:
- 312 grams castor oil (1 mol)
- 200 grams NaOH (5 mol)
- 131 grams water (7.3 mol)
- No catalyst Temperature to 320° C.; time of stay above 250° C.: 60 minutes. Yield: 121.5 grams sebacic acid=70.6% of the theoretical yield.

Example 18

Batch:
- 298 grams castor oil fatty acid (1 mol)
- 120 grams NaOH (3 mol)
- 105 grams water (5.8 mol)
- 5.9 grams $TlNO_3$ (containing 4.5 grams metal)

Temperature to 320° C.; time of stay above 250° C.: 44 minutes. Yield: 145 grams sebacic acid=84.3% of the theoretical yield.

Example 19

Batch:
- 298 grams castor oil fatty acid (1 mol)
- 120 grams NaOH (3 mol)
- 105 grams water (5.8 mol)
- 4.87 grams $TlNO_3$
- 0.97 gram CdO (containing 4.5 grams metal)

Temperature to 320° C.; time of stay above 250° C.: 42 minutes. Melting point of the catalyst alloy 205° C. Yield: 150 grams sebacic acid=87.2% of the theoretical yield.

Example 20

Batch:
- 298 grams castor oil fatty acid (1 mol)
- 120 grams NaOH (3 mol)
- 105 grams water (5.8 mol)
- 3.5 grams $BiCl_3$
- 2.41 grams $PbCl_2$
- 0.42 gram CdO (containing 4.5 grams metal)

Temperature to 320° C.; time of stay above 250° C.: 44 minutes.

The pressure during the course of the heating rose to 80 kg./cm.² and was then maintained at this level by opening the valve during the entire reaction time.

Yield: 148.5 grams sebacic acid=86.4% of the theoretical yield.

Example 21

Batch:
- 298 grams castor oil fatty acid (1 mol)
- 120 grams NaOH (3 mol)
- 105 grams water (5.8 mol)

As catalyst there was used the alloy obtained upon working up the reaction product of Example 20 and the 4.5 grams of metal short (lost during the working) were supplemented by a mixture of salts of bismuth, lead and cadmium of the composition indicated in Example 20.

Temperature to 320° C.; time of stay above 250° C.: 30 minutes. The pressure was maintained at 40 kg./cm.². Yield: 142 grams sebacic acid=82.6% of the theoretical yield.

Example 22

Batch:
- 298 grams castor oil fatty acid (1 mol)
- 120 grams NaOH (3 mol)
- 105 grams water (5.8 mol)

The alloy obtained upon the working up of the reaction product of Example 21 was dissolved in nitric acid and the solution evaporated. The salt mixture obtained was added as catalyst.

Temperature to 320° C.
Time of stay above 250° C: 29 minutes.
The pressure was maintained at 15 kg./cm.$^2$.
Yield: 147.5 grams sebacic acid=85.7% of the theoretical yield.

Example 23

For comparison with the result of Example 22, the same experiment was carried out without the addition of catalysts.

Batch:
- 298 grams castor oil fatty acid (1 mol)
- 120 grams NaOH (3 mol)
- 105 grams water (5.8 mol)
- No catalyst Temperature to 320° C.
Time of stay above 250° C.: 38 minutes.
Upon reaching 15 atmospheres, the pressure was maintained at this value.
Yield: 128 grams sebacic acid=174.5% of the theoretical yield.

Example 24

Batch:
- 298 grams castor oil fatty acid (1 mol)
- 120 grams NaOH (3 mol)
- 105 grams water (5.8 mol)
- 6.2 grams PbCl$_2$ ⎱ (containing 4.5 grams Pb)
- 1.25 grams SbCl$_3$ ⎰

Temperature to 320° C.
Time of stay above 250° C.: 42 minutes.
Melting point of the catalyst alloy 248° C.
Yield: 137.5 grams sebacic acid=80.1% of the theoretical yield.

Example 25

Batch:
- 298 grams castor oil fatty acid (1 mol)
- 120 grams NaOH (3 mol)
- 74 grams water (4.1 mol)
- 2.28 grams PbCl$_2$ ⎱ (containing 4.5 grams metal)
- 3.65 grams TlNO$_3$ ⎰

Temperature to 320° C.
Time of stay above 250° C.: 40 minutes.
Melting point of the catalyst alloy 380° C.
Yield: 145.5 grams sebacic acid=84.7% of the theoretical yield.

Example 26

The following experiment was carried out for the preparation of hydroxy capric acid.

Batch:
- 298 grams castor oil fatty acid (1 mol)
- 80 grams NaOH (2 mol)
- 95 grams water (5.3 mol)
- 3.5 grams BiCl$_3$ ⎫
- 2.41 grams PbCl$_2$ ⎬ (containing 4.5 grams metal)
- 0.42 gram CdO ⎭

Time of stay above 150° C.: 75 minutes.
Time of stay at the maximum temperature of 190° C.: 50 minutes.
Maximum pressure 32 kg./cm.$^2$.
Yield:
- 42.5 grams sebacic acid
- 13.0 grams hydroxy capric acid

Example 27

For the continuous carrying out of the method of the invention, castor oil fatty acid which contained 4.0% Pb and 0.4% Bi in the form of ricinoleate as the catalyst and 50% caustic soda solution was forced by two dosage pumps into a mixing chamber and conducted from there into a reaction coil consisting of a nickel pipe of 50 meters length and a volume of 4.2 liters. This nickel tube was located in a heating bath which was heated to 320° C. The starting materials were forced with such speed into the reaction coil that their time of stay in the coil was 25 minutes. The reaction product was then conducted through a separating vessel in which the main portion of the catalyst deposited out into a surge chamber at the lower end of which the pressure on the mass was reduced by a valve and the mass introduced into water. The valve was so set that the pressure in the surge chamber was 50 kg./cm.$^2$.

After being placed in operation, the apparatus was operated until the indicated operating conditions (rate of flow, temperature, pressure) prevailed in the entire apparatus. For the determination of the yield the product obtained in 29 minutes from a longer period of operation was worked up. During these 29 minutes 2163 grams of castor oil fatty acid and 2830 grams of 50% caustic soda solution were passed through. From the reaction product, 1012 grams sebacic acid=81% of the theoretical yield were isolated.

Example 28

The experiments set forth in Examples 28–34 were carried out in a kneader, the upper opening of which was provided with a vapor inlet pipe and a vapor outlet pipe. The vapor outlet pipe led to a cooler in which the water which distilled off upon the heating of the reaction mixture and octanol formed in the reaction were condensed. The reaction vessel was accordingly under normal pressure during the entire experiment. Furthermore, steam was conducted through the reaction vessel during the entire experiment. The temperature was raised to 280° C. and held at this temperature for 50 minutes. After the shutting off of the heating, the reacting vessel was allowed to cool by itself without the outwardly cooling with air. The time of stay above 250° C. was 70 minutes.

Batch:
- 1500 grams castor oil fatty acid (5 mol)
- 600 grams NaOH (15 mol)
- 244 grams water (13.5 mol)
- 84 grams PbCl$_2$ ⎱ containing 75.5 grams metal
- 15 grams CdO ⎰

Yield: 490 grams sebacic acid=57.0% of the theoretical yield.

Example 29

Batch:
- 1500 grams castor oil fatty acid (5 mol)
- 370 grams NaOH (9.25 mol)
- 325 grams KOH (5.8 mol)
- 260 grams water (14.5 mol)
- 84 grams PbCl$_2$ ⎱ (containing 75.5 grams metal)
- 15 grams CdO ⎰

Yield: 633 grams sebacic acid=73.6% of the theoretical yield.

Example 30

Batch:
- 750 grams castor oil fatty acid (2.5 mol)
- 750 grams tallow fatty acid (2.75 mol)
- 415 grams NaOH (10.4 mol)
- 220 grams water (12.2 mol)
- 42 grams PbCl$_2$ ⎱ (containing 38 grams metal)
- 7.5 grams CdO ⎰

Yield: 332 grams sebacic acid=77.3% of the theoretical yield.

Example 31

Batch:
- 750 grams castor oil fatty acid (2.5 mol)
- 750 grams tallow fatty acid (2.75 mol)
- 225 grams NaOH (5.6 mol)
- 305 grams KOH (5.4 mol)
- 234 grams water (13.0 mol)
- 42 grams PbCl$_2$ }
- 7.5 grams CdO } (containing 38 grams metal)

Yield: 364 grams sebacic acid=84.7% of the theoretical yield.

Example 32

Batch:
- 900 grams castor oil fatty acid (3.0 mol)
- 410 grams tallow fatty acid (1.5 mol)
- 259 grams NaOH (6.5 mol)
- 226 grams KOH (4.0 mol)
- 210 grams water (11.7 mol)
- 50.5 grams PbCl$_2$ }
- 9.0 grams CdO } (containing 46 grams metal)

Yield: 441 grams sebacic acid=85.5% of the theoretical yield.

Example 33

For comparison with the results of Example 32, a test was carried out without the addition of catalyst.

Batch:
- 900 grams castor oil fatty acid (3.0 mol)
- 410 grams tallow fatty acid (1.5 mol)
- 259 grams NaOH (6.5 mol)
- 226 grams KOH (4.0 mol)
- 210 grams water (11.7 mol)

Yield: 332 grams sebacic acid=64.3% of the theoretical yield.

Example 34

Batch:
- 900 grams castor oil fatty acid (3.0 mol)
- 410 grams tallow fatty acid (1.5 mol)
- 340 grams NaOH (8.5 mol)
- 113 grams KOH (2 mol)
- 210 grams water (11.7 mol)
- 50.5 grams PbCl$_2$ }
- 9.0 grams CdO } (containing 46 grams metal)

Yield: 458 grams sebacic acid=88.7% of the theoretical yield.

The experiments set forth in the Examples 1, 2, 7, 18 and 25 were carried out using as catalysts equivalent amounts of the oxides, hydroxides, sulfates, formates, acetates, carbonates, benzoates, plumbates, bismuthates and of the free metals in form of a fine powder. Similar results were obtained.

We claim:

1. In the process for the production of a member selected from the group consisting of hydroxy capric acid and sebacic acid by the thermal degradation of a ricinoleic compound selected from the group consisting of alkali metal salts of ricinoleic acid, castor oil and castor oil fatty acid, the improvement of heating said ricinoleic compound to a temperature of about 150–450° C. in the presence of an alkali metal hydroxide and a catalyst in the form of an alloy having a melting point below the reaction temperature, said alloy essentially consisting of 5–95% by weight of an active metal selected from the group consisting of lead, bismuth and thallium and at least one second metal selected from the group consisting of a different member of said last mentioned group cadmium, indium, tin and antimony.

2. Improvement according to claim 1 in which said alloy is formed in situ during the reaction.

3. Improvement according to claim 1 in which said alloy has a melting point below 300° C.

4. Improvement according to claim 1 in which said alloy has a melting point below about 200° C.

5. Improvement according to claim 1 which includes allowing the catalyst to form a separate liquid layer in the reaction mixture and withdrawing said separate liquid layer of catalyst.

6. Improvement according to claim 1 in which said ricinoleic compound is an alkali metal salt of ricinoleic acid in which said heating is effected to a temperature between about 200 and 450° C. in the presence of a molar excess of an aqueous solution of an alkali hydroxide for the formation of sebacic acid.

7. Improvement according to claim 6 in which said catalyst is present in amount between about 0.05% and 20% by weight based on said ricinoleate.

8. Improvement according to claim 7 in which said heating is effected at a temperature between about 250° and 350° C.

9. Improvement according to claim 1 in which said ricinoleic compound is castor oil and in which said heating is effected to a temperature between about 200° and 450° C. in the presence of at least one mol of water per mol of said ricinoleic compound and at least 2 mols of an alkali hydroxide per mol of said ricinoleic compound with the formation of sebacic acid.

10. Improvement according to claim 1 in which said ricinoleic compound is castor oil fatty acid and in which said heating is effected to a temperature between about 200° and 450° C. in the presence of at least one mol of water per mol of said ricinoleic compound and at least 2 mols alkali hydroxide per mol of said ricinoleic compound with the formation of sebacic acid.

11. Improvement according to claim 1 in which said ricinoleic compound is castor oil, and in which said heating is effected at a temperature between 200° and 450° C. in the presence of about 6 mols of water per mol of said ricinoleic compound and at least three mols of a member selected from the group consisting of sodium hydroxide and potassium hydroxide and mixtures thereof per mol of said ricinoleic compound.

12. Improvement according to claim 1 in which said ricinoleic compound is castor oil fatty acid, and in which said heating is effected at a temperature between 200° and 450° C. in the presence of about 6 mols of water per mol of said ricinoleic compound and at least 3 mols of a member selected from the group consisting of sodium hydroxide and potassium hydroxide and mixtures thereof per mol of said ricinoleic compound.

13. Improvement according to claim 1 in which said ricinoleic compound is an alkali metal ricinoleate, and in which said heating is effected to a temperature between 150° and 200° C. in the presence of at least a molar amount of an alkali hydroxide solution with the formation of hydroxy capric acid.

14. Improvement according to claim 13 in which heating is effected to a temperature between 160° and 190° C.

References Cited in the file of this patent

UNITED STATES PATENTS

| | | |
|---|---|---|
| 2,182,056 | Bruson et al. | Dec. 5, 1939 |
| 2,217,515 | Houpt | Oct. 8, 1940 |
| 2,694,081 | Stein et al. | Nov. 9, 1954 |
| 2,696,501 | Stein et al. | Dec. 7, 1954 |
| 2,851,491 | Naughton et al. | Sept. 9, 1958 |
| 2,851,492 | Naughton et al. | Sept. 9, 1958 |

OTHER REFERENCES

Lohse: "Catalytic Chemistry," published by Chemical Publishing Co. (N.Y.), 1945, p. 141.

UNITED STATES PATENT OFFICE
CERTIFICATION OF CORRECTION

Patent No. 3,031,482                                                April 24, 1962

Werner Stein et al.

It is hereby certified that error appears in the above numbered patent requiring correction and that the said Letters Patent should read as corrected below.

Column 4, in the table, column 1, line 15 thereof, for "Sn+10 Ce" read -- Sn+10 Cd --; column 6, lines 32 and 33 should be bracketed together before the parenthesis "containin 4.5 grams metal)"; column 9, line 30, for "174.5%" read -- 74.5% --; column 10, line 3, for "4.0%" read -- 0.4% --; column 12, under the heading UNITED STATES PATENTS, add the following:

2,696,500    Stein -------------- Dec. 7, 1954

Signed and sealed this 18th day of September 1962.

(SEAL)
Attest:

ERNEST W. SWIDER                                     DAVID L. LADD

Attesting Officer                                          Commissioner of Patent